Oct. 9, 1928.
W. A. STOCKDALE
1,687,113
CASTER
Filed Nov. 10, 1926
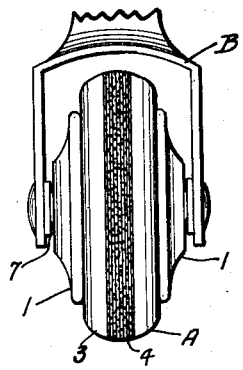
FIG. I
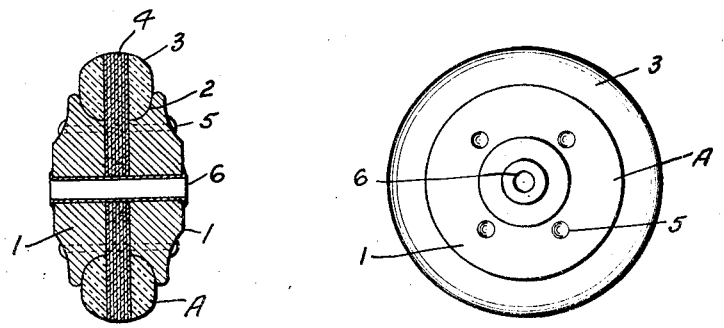
FIG. II        FIG. III
Inventor
WILLIAM A. STOCKDALE
BY:- Ben V. Zillman
Attorney Patented Oct. 9, 1928.

1,687,113

UNITED STATES PATENT OFFICE.

WILLIAM A. STOCKDALE, OF ZANESVILLE, OHIO.

CASTER.

Application filed November 10, 1926. Serial No. 147,458.

My invention has among its objects, the production of a device of the kind described, which shall support heavy loads, shall roll quietly and smoothly over the varnished or polished floor without fear of marring or scratching the same, and which shall absorb the shocks and jars incidental to the moving of the supported loads.

Another object of my invention is to provide a device of the kind described, which shall have a rubber roller, reinforced with a fabric material, so that the wear upon the roller will be taken up by the fabric, as well as by the rubber, and thus increase the life of the caster, and also increase its carrying capacity.

Another object of reinforcing the caster roller as with a disk of heavy webbing material, is so that the article being supported will not become displaced, but will be maintained in its proper position.

Other objects of my invention are to provide a caster of the kind described, that will be simple, convenient, economical, noiseless, sturdy, wear-resisting, reliable, and efficient and satisfactory for use wherever found applicable.

Many other objects of the construction herein shown and described, and advantages thereof, will be obvious to those skilled in the art to which this invention appertains, from the disclosures herein given.

To this end, my invention consists in the novel construction, arrangement, and combination of parts herein shown and described, and more particularly pointed out in the claims.

In the drawings, wherein like reference characters indicate like or corresponding parts throughout the views, Figure I is an elevational view of my improved caster, with part of the supporting frame-work broken away;

Figure II is a vertical cross-section taken through the caster wheel; and

Figure III is a side elevation of the wheel shown in Figure II.

In the drawings, wherein I have illustrated the preferred embodiment of my invention, A indicates the caster wheel proper, and B indicates the carrying or supporting frame therefor. The carrying frame may be of any suitable or preferred construction, and will not be described further, as the same does not form a part of my invention.

Rubber tires have already been used for casters, but usually for light loads, or, where intended for heavy loads the rubber tread is unduly wide and heavy.

My invention has among its objects, the production of a caster wheel, which although rubber-tired, such tires will not be unduly heavy, the necessary strength being obtained in another manner, as will hereinafter be described.

My improved caster wheel comprises the pair of side pieces 1, 1, made of metal or the like, in any suitable size and shape, the opposed edges of the same forming a substantially semi-circular groove 2 therebetween.

The load-supporting member comprises a resilient annulus, preferably made of rubber, 3, and intermediate the sides of the rubber annulus there is arranged a tread-portion or wear element in the shape of a disk 4. This disk is preferably made of fibrous or fabric material, such as one or more plies or thicknesses of heavy webbing or duck, and all vulcanized together and to the rubber annulus 3, as shown, in order to form an integral, unitary, load-supporting member that will be noiseless, smooth, and at the same time be able to support very heavy loads without becoming deformed and which will wear but slowly.

Rivets or pins 5 may be used to hold the sides and load-supporting member together, if desired, and a bushing or sleeve 6, of steel or other suitable material, may be inserted through the wheel in order to provide a strong, smooth bearing for the axle of the supporting frame-work, the ends of the sleeve being spun over the outer faces of the side pieces 1, if so desired.

Washers 7 may be interposed between the side arms of the yoke of the supporting frame B and the caster wheel, as shown in Figure I, if preferred.

From the foregoing description, it will be seen that I have provided a caster wheel, which shall be capable of supporting extremely heavy loads without becoming deformed, thus throwing the load out of alignment, which will be noiseless in operation, and which will have great wearing powers.

Having thus described my invention, it will be obvious that various immaterial modifications may be made in the same without departing from the spirit of my invention; hence I do not wish to be understood as limiting myself to the exact form, construction, arrangement and combination of parts herein shown and described, or uses mentioned, except as limited by the claims.

What I claim as new and desire to secure by Letters Patent is:—

1. A furniture caster comprising a rubber load-supporting and tread annulus, a plurality of layers of fabric webbing material joined together to form a stiff disk and vulcanized integral with said annulus and having its outer periphery substantially flush with the outer periphery of said annulus, thereby providing a reinforced tread therewith, and a metal sleeve axially through said disk to provide an axle bearing for said caster.

2. A furniture caster wheel comprising side pieces each having a peripheral recess therein, a heavy fabric disk between said side pieces and projecting radially therebeyond to form the main tread portion of the caster, resilient rubber members on each side of said disk and also forming a portion of the tread for the caster and fitting into the peripheral groove formed by said pair of peripheral recesses and means for holding said parts together.

WILLIAM A. STOCKDALE.